(No Model.)

W. H. LEWIS.
PHOTOGRAPHIC CAMERA.

No. 342,212. Patented May 18, 1886.

WITNESSES:
Donn Twitchell
C. Sedgwick

INVENTOR:
W. H. Lewis
BY Munn & Co
ATTORNEYS.

UNITED STATES PATENT OFFICE.

WILLIAM H. LEWIS, OF NEW YORK, N. Y., ASSIGNOR TO E. & H. T. ANTHONY & CO., OF SAME PLACE.

PHOTOGRAPHIC CAMERA.

SPECIFICATION forming part of Letters Patent No. 342,212, dated May 18, 1886.

Application filed December 8, 1885. Serial No. 185,056. (No model.)

*To all whom it may concern:*

Be it known that I, WILLIAM H. LEWIS, of the city, county, and State of New York, have invented a new and useful Improvement in Photographic Cameras, of which the following is a full, clear, and exact description.

This invention relates to what are known as "swing-back cameras"—that is, photographic cameras in which the back or portion that has usually combined with it the ground glass used in focusing, and that serves to carry the holder of the sensitized plate or sheet, is made angularly adjustable relatively to the horizon, or out of parallelism with the lens, to provide for taking objects or views out of direct line with the lens—as, for instance, sky or ground—without disturbing the instrument or tripod on which it stands.

The invention consists in certain novel, simple, and efficient means of attaching, carrying, and securing at any desired angle the swinging back, and whereby said back may be released and fastened on both sides of the camera by operating the fastening device from one side only of the instrument, thereby saving time, and being much more convenient than when separately operating, adjusting, or securing means from opposite sides of the camera, as heretofore.

Reference is to be had to the accompanying drawings, forming a part of this specification, in which similar letters of reference indicate corresponding parts in both the figures.

Figure 1:
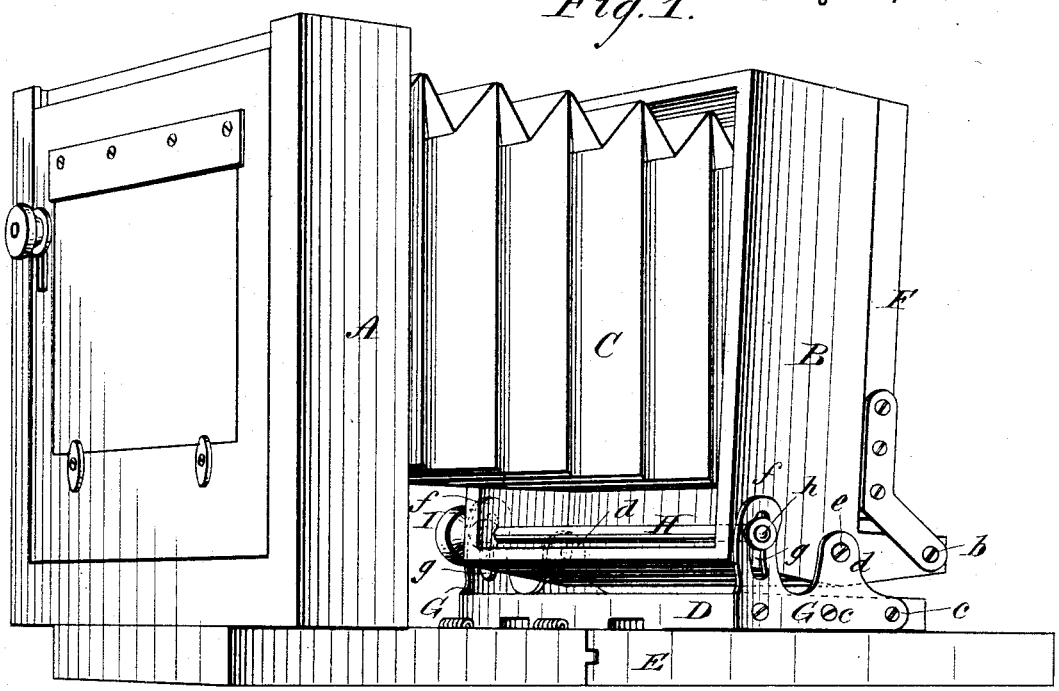
Figure 2:
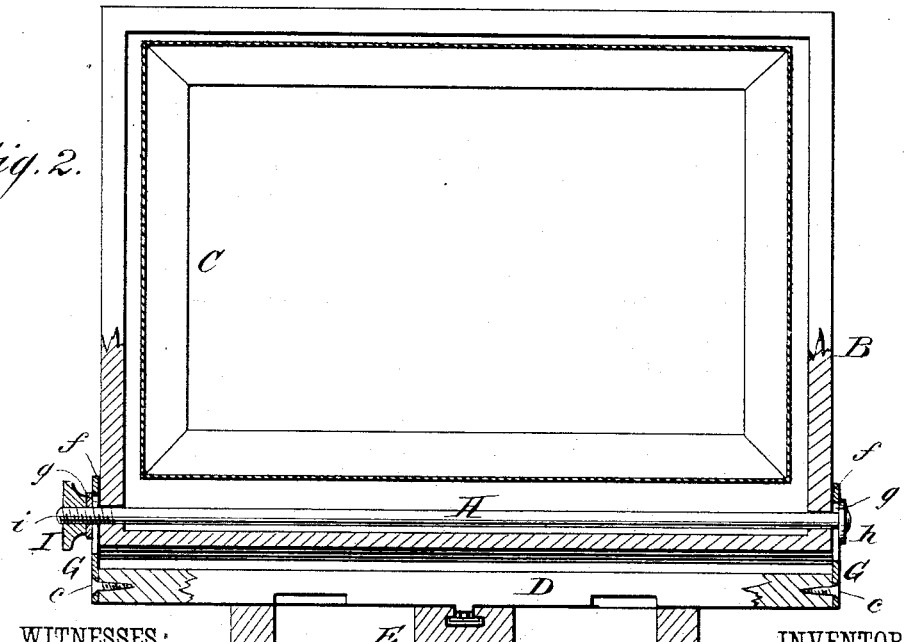

Figure 1 represents a view in perspective of a photographic camera, in part, with my invention applied; and Fig. 2, a partly broken and transverse sectional view, mainly in illustration of the means used to carry and secure the swinging back.

A indicates the front portion of the instrument, with the lens and lens-tube omitted. B is the swinging back, and C the bellows connecting said front and back.

D is the base-piece, with which the swinging back is connected, and which may be adjustable on or along the table-piece E, to provide for distending or collapsing the bellows in focusing; or it may be stationary and the front of the camera made similarly adjustable.

F indicates the frame that carries the ground glass on the rear of the swinging back, and that is pivoted below at $b$ on either side, as usual, to admit of its being dropped when requiring to insert the plate-holder within the swinging back.

G G are plates secured—as, for instance, by screws $c$—to opposite ends of the base-piece D, and virtually forming a part of the base-piece—that is, one plate on each side of the camera. These plates are each suitably shaped or constructed—as, for instance, by forming them with a short upwardly-projecting back arm, $d$, to which the swinging back is pivoted below, on opposite sides of the camera, as at $e$, and with a longer upwardly-projecting front arm, $f$, having a curved slot, $g$, in it struck from each pivot $e$ as a center.

Arranged to pass through the swinging back B from one to the other side of the camera, and through the slots $g$ in the plates G, which, as before observed, virtually form a part of the base piece D, is a rod, H, having a head, $h$, at its one end outside of the one plate G, and a screw-thread, $i$, at its opposite end beyond the other plate G, and onto which a screw button or nut, I, is fitted. This screw-threaded rod and button serve, in connection with the plates G G, to which the swinging back B is pivoted on opposite sides, as at $e$, to provide for securing said back in position after it has been adjusted by swinging it forward or backward on the pivots $e$ to its required angular position relatively with the horizon, and this securing of the swinging back B, or releasing it after it has been adjusted, to vary the angle, is effected by simply and suitably turning the button I on the screw-threaded end of the rod H. This being done from the one side of the camera only, though firmly holding the swinging back on both sides of the instrument, affords the greatest convenience and saves time.

Instead of the rod H having a head at its one end forming an integral portion of it, or, in other words, a fast head, it may have a screw-thread on both of its ends, and both of such threaded portions be fitted with screw-threaded buttons or nuts similar to the one, I, shown in the drawings. This will admit of the swinging back being fastened at its angular adjustment or released, as required, by the operator from either side of the camera, either one button in such case being in a state of rest on the rod, and virtually forming the head thereof, and the other button being turned to screw or unscrew on the rod, as required.

Washers, if desired, may be placed under or back of the buttons or button and head of the rod, as shown in the drawings.

Having thus fully described my invention, I claim as new and desire to secure by Letters Patent—

1. In photographic cameras having swinging or angularly-adjustable backs, the combination, with the swinging back and base-piece carrying the same, of a screw-threaded rod arranged to extend across said back to opposite sides of the instrument and an adjustable button or nut on said rod, whereby the swinging back may be firmly and simultaneously secured or fastened on both sides of the camera, or be simultaneously released on both sides thereof, by the turning of one and the same button or nut on the rod which is extended across the back of the camera, substantially as specified.

2. The combination, with the swinging back B of the camera and its base-piece D, of the slotted plates G G, the headed screw-threaded rod H, extended across the back B, and the screw-threaded button or nut I, essentially as and for the purpose or purposes herein set forth.

WILLIAM H. LEWIS.

Witnesses:
 EDWD. M. CLARK,
 EDGAR TATE.